May 19, 1931.  C. W. McKINLEY  1,806,561
OIL PRESSURE BOOSTER
Filed Jan. 7, 1927
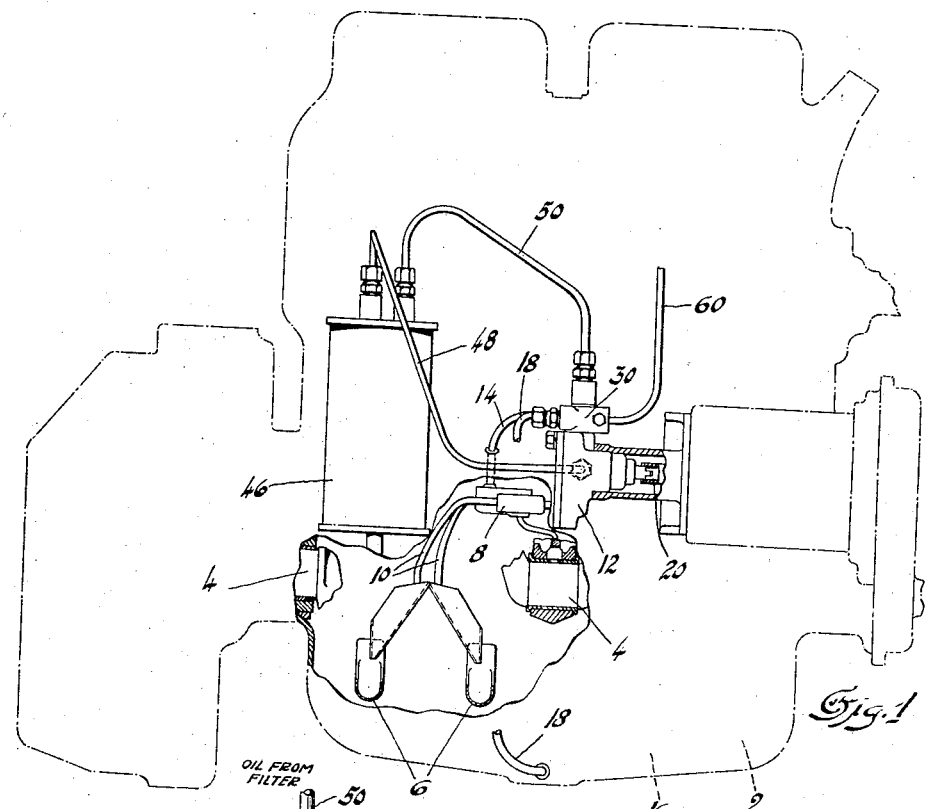
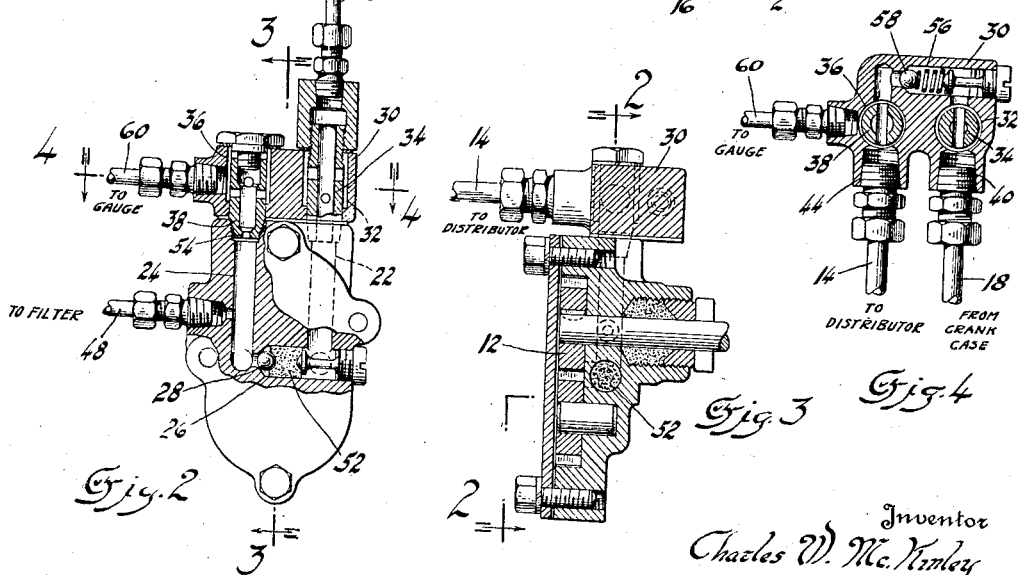
Inventor
Charles W. McKinley
By Blackmore, Spencer & Flint
Attorneys Patented May 19, 1931

1,806,561

UNITED STATES PATENT OFFICE

CHARLES W. McKINLEY, OF FLINT, MICHIGAN, ASSIGNOR TO A C SPARK PLUG COMPANY, OF FLINT, MICHIGAN, A COMPANY OF MICHIGAN

OIL PRESSURE BOOSTER

Application filed January 7, 1927. Serial No. 159,604.

In certain types of engine lubricating systems, of which that used in the Chevrolet automobile engine is a well known example, the oil is fed to the bearings under rather low pressure. Actually the pressure is but slightly more than a slight gravity head. When an oil filter is applied to a lubricating system of this type, it is found that owing to the low pressure the entire body of oil is not circulated through the filter with sufficient frequency to insure clean oil under all operating conditions. Likewise the low pressure permits the filter to clog after relatively short service.

To permit more effective use of a filter in such systems, I have devised an arrangement for boosting the pressure of the oil supplied to the filter while at the same time maintaining normal pressure at the bearings. This I have accomplished by providing a restriction in the line feeding oil to the bearings and leading oil from the near or pump side of the restriction to the filter, returning the filtered oil to the suction side of the pump.

In adapting my system to the Chevrolet engine it is merely necessary to permanently close the usual pressure operated by-pass provided in the pump housing and apply to the pump a fitting containing the restriction, a pressure relief valve beyond the restriction, and suitable connections leading to the crank case oil supply, to the oil distributor and pressure gage. Connections are provided for supplying the filter with oil from the passage leading from the pump to the restriction, and for returning the filtered oil to the suction side of the pump preferably through the intake port in the fitting.

One of the principal objects of the invention is to produce an oiling system which will return the oil from the filter direct to the pump instead of allowing the filtered lubricant to flow back to the crankcase as in prior constructions. Because of my improved construction I am able to utilize the filter oil for direct lubrication of the bearings instead of the partially contaminated oil from the crankcase. Inasmuch as the filter oil is immediately returned from the suction side to the pressure side of the pump for delivery to the engine bearings and oil filter, the stream of oil flowing to the bearings will at all times contain a substantial quantity of filtered oil coming direct from the filter.

In the drawings:

Fig. 1 is a side view of a Chevrolet engine showing my invention applied thereto;

Fig. 2 is a view taken approximately on line 2—2 of Fig. 3;

Fig. 3 is a view on line 3—3 of Fig. 2;

Fig. 4 is a view on line 4—4 of Fig. 2;

Reference character 2 indicates the well known Chevrolet engine of which the crank shaft is indicated by 4 and the dip troughs receiving the dippers on the connecting rods are indicated by reference character 6. In the Chevrolet engine the dip troughs 6 and bearings 4 are supplied with oil from distributor 8 by means of suitable conduits 10. Oil is supplied to the distributor 8 from pump 12 through conduit 14, the pump in turn being supplied with oil from the crank case 16 through conduit 18, the central portion of which is shown broken away. According to Chevrolet practice a spring pressed valve is provided in the distributor 8, the valve opening in the direction of flow to the bearings so that as the pressure of the oil supplied by the pump increases the valve opens more widely permitting increased flow to the bearings and troughs. The purpose of this valve is to slightly obstruct the flow of oil so as to build up sufficient pressure to register upon a gage provided upon the instrument board. This gage indicates that oil is being supplied to the bearings but does not indicate the actual pressure at the bearings for as is obvious from the drawings, oil is supplied to the bearings and troughs under little more than gravity head and this pressure is too low to register on the ordinary type of pressure gage. I have illustrated the pump as of the gear type driven from shaft 20 which may be the generator shaft geared to the crank shaft. This has been done for ease of illustration. Actually in the present Chevrolet engine the pump is at the lower end of a vertical shaft depending into the crank case and driven from the cam shaft.

Conduit 18 is normally secured at one end within the end of the tapped portion 40 of the fitting 30 and leads to a passage 22 leading to the intake side of the pump, while conduit 14 is normally secured within the interiorly threaded end of passage 24 leading from the discharge side of the pump. A passage 26 connects the passages 22 and 24 and in the passage is arranged ball valve 28 normally held against its seat by a spring not shown. This valve serves as a pressure relief valve short-circuiting the pump when the line becomes clogged and the pump pressure becomes excessive thereby preventing injury to the pump structure.

The construction so far described forms no part of my invention except insofar as it cooperates with the parts hereinafter described.

In adapting an oil filter to the lubricating system so far described I secure fitting 30 to the upper end of the pump housing, the fitting being provided with inlet passage 32 communicating with passage 22 and receiving ported plug 34 secured in the threaded end of passage 22 and with outlet passage 36 communicating with passage 24 receiving ported plug 38 secured in the end of passage 24. Fitting 30 is likewise tapped at 40 to establish communication between passage 32 and conduit 18 leading oil from the crank case to the pump; and at 44 to establish communication between passage 36 and conduit 14 leading to the oil distributor.

I have indicated my oil filter at 46. This filter receives oil from the pump through conduit 48 communicating with the pump discharge passage 24. Filtered oil is returned from the filter to the suction side of the pump through conduit 50 communicating with inlet passage 32.

To increase the pressure at which oil is supplied to the filter I first disable the pressure relief valve 28 by replacing the spring with a plug 52 of any suitable material such as felt. Next I provide a restriction 54 in the plug 38. The function of this restriction is to dam up the oil so that the pressure in the portion 24 of the line leading to the filter and bearings is higher than normal,—in actual practice about 20 pounds compared with a normal pressure of 8 pounds.

To safeguard the pump against injury in case of stoppage in the oil supply line I have provided a pressure relief valve in the fitting 30. Thus I have provided a passage 56 connecting the intake passage 32 and the outlet passage 36 and in that passage have provided a spring-pressed ball valve 58. When excessive pressures develop on the discharge side of the pump this valve opens, establishing direct communication between the inlet and outlet of the pump.

The operation of the apparatus is as follows:

Pump 12 draws oil from the crank case 16 through conduit 18 and passage 32 and 22, and discharges it into passage 24. The restriction at 54 causes the oil pressure to build up to a relatively high value. The conduit 48 leads oil from the passage 24 to the filter 46 where it is thoroughly cleaned. The filtered oil returns to the suction side of the pump through conduit 50 and passage 32—22. The oil supplied to the bearings passes through restriction 54 into passage 36 and is thence discharged through conduit 14 into distributor 8. Here the oil after passing the spring pressed control valve flows to the bearings and drip troughs through the pipes 10 as shown. The conduit 60, leading as it does, from the passage 36 on the far side of the restriction 54 gives the usual indications on the oil gage.

Should the pressure in the system become excessive owing to clogging, the pressure by-pass valve 58 will operate to short-circuit the pump. It will be remembered that the pressure by-pass 28 provided as factory equipment has been disabled by means of plug 52.

I claim:

1. The combination of an engine having parts to be lubricated, a low pressure circulating system for supplying oil to said parts, a pump for building up pressure in a portion of said system whereby the system is divided into a portion of greater than normal pressure and a portion of normal pressure, an oil filter, and means for conducting oil from said first named portion to the filter, and means for returning oil from the filter directly to the pump.

2. The combination of a low pressure lubricating system, an invariable restriction for stepping up the pressure in a portion of said system, an oil filter, and means for passing oil from said portion through said filter.

3. The combinaton of an engine lubricating system including a pump, means for conducting lubricant from said pump to the parts to be lubricated, an invariable restriction in said means, an oil filter, means for conducting oil from said means on the near side of said restriction to said filter, and means for leading oil from said filter to the system beyond the restriction.

4. In an oiling system, in combination, a filter, a pump, a restriction in the oil line at one side of the pump to cause an increased quantity of oil to flow to the filter, and means for returning the filtered oil directly to the other side of the pump.

5. In an oiling system, a filter, a pump, a fitting secured to said pump, means in said fitting to cause an increased quantity of oil to flow to the filter, and means for returning the filtered oil directly to the pump.

6. The structure of claim 5, said first named means comprising a restricted passage.

7. In combination with an engine having a lubricating system interrelated therewith, a pump for forcing the lubricant through said system, a fitting attached to and having communicaton with said pump, said fitting serving as a means to receive the lubricant for the pump and having means to distribute it to a plurality of points, a lubricant purifier in said system, means to convey lubricant from the pump to the purifier, and means for returning the purified oil directly to the pump.

8. In combination with an engine having a lubricating system interrelated therewith, a pump to force lubricant through the system, a fitting attached to the pump said fitting having openings, inlet and outlet plugs in said openings, means communicating with said plugs to deliver lubricant to the pump and convey the lubricant to a plurality of points, a filter in said system receiving its supply of oil from the pump, and a restricton in one of said plugs to build up the pressure toward the filter.

9. In combination with an engine having a lubricating system interrelated therewith, a pump to force lubricant through the system, a fitting attached to the pump said fitting having openings, inlet and outlet plugs in said openings, means communicating with said plugs to deliver lubricant to the pump and convey the lubricant to a plurality of places on the engine, and a bypass between said openings.

10. The combination of an engine having parts to be lubricated, a low pressure circulating system for supplying oil to said parts, a pump for building up pressure in a portion of said system whereby the system is divided into a portion of greater than normal pressure and a portion of normal pressure, an oil filter, means for conducting oil from said first named portion to the filter, and means communicating with the pump at the suction side thereof for returning oil from the filter directly to the pump.

In testimony whereof I affix my signature.
CHARLES W. McKINLEY.